United States Patent [19]

Morinaga et al.

[11] Patent Number: 4,576,205

[45] Date of Patent: Mar. 18, 1986

[54] TUBULAR LINING MATERIAL FOR PIPE LINES HAVING BENDS

[75] Inventors: Akio Morinaga, Kanagawa; Yoichi Sakaguchi, Tokyo; Masakatsu Hyodo; Isaburo Yagi, both of Osaka, all of Japan

[73] Assignees: Tokyo Gas Co., Ltd., Tokyo; Ashimori Industry Co., Ltd., Osaka, both of Japan

[21] Appl. No.: 601,713

[22] Filed: Apr. 18, 1984

[30] Foreign Application Priority Data

Apr. 18, 1983 [JP] Japan ................... 58-68944

[51] Int. Cl.⁴ .............. F16L 55/16; B29C 27/16
[52] U.S. Cl. .................... 138/98; 138/124; 138/125; 139/387 R; 156/287
[58] Field of Search .............. 138/98, 123, 124, 125; 139/387 R, 388; 156/287

[56] References Cited

U.S. PATENT DOCUMENTS

| | | | |
|---|---|---|---|
| 1,365,809 | 1/1921 | Atwood | 139/398 R X |
| 1,439,323 | 12/1922 | Petersen | 138/124 |
| 2,009,075 | 7/1935 | Thompson | 139/387 R X |
| 3,316,557 | 5/1967 | Liebig | 139/387 R X |
| 4,239,063 | 12/1980 | Long | 138/123 |
| 4,334,943 | 6/1982 | Zenbayashi et al. | 156/287 |
| 4,350,548 | 9/1982 | Zenbayashi et al. | 138/124 X |
| 4,368,091 | 1/1983 | Ontsuga et al. | 138/98 X |
| 4,427,480 | 1/1984 | Kamuro et al. | 156/287 |

FOREIGN PATENT DOCUMENTS

2225560 8/1974 France ................... 139/387 R

Primary Examiner—James E. Bryant, III
Attorney, Agent, or Firm—Birch, Stewart, Kolasch & Birch

[57] ABSTRACT

A tubular lining material for pipe lines having bends or curved portions, which comprises a tubular textile jacket made of warps and wefts woven in a tubular form overlaid with a coating of a flexible synthetic resin and is applicable onto the inner surface of a pipe line having bends or curved portions in such manner that the tubular lining material with a binder onto the inner surface thereto is inserted into the pipe line and allowed to advance within the pipe line with or without the aid of a leading rope-like elongated element while turning the tubular lining material inside out under fluid pressure thereby applying the tubular lining material onto the inner surface of the pipe line with the binder being interposed between the pipe line and the tubular lining material, characterized in that a part or all of the warps are comprised of an elastic yarn around which, over the full length thereof, a synthetic fiber yarn or yarns have been left-and/or right-handedly coiled. This tubular lining material is particularly suitable for use in a lining method taking advantage of evagination as disclosed in U.S. Pat. No. 4,334,943 for lining a pipe line having an inner diameter of 25–200 mm and a plurality of bends, such as service pipe lines or house pipe lines of gas without occurrence of wrinkles in the lining material in a bend.

14 Claims, 11 Drawing Figures

TUBULAR LINING MATERIAL FOR PIPE LINES HAVING BENDS

BACKGROUND OF THE INVENTION

1. Field of the Invention

The present invention relates to a new lining material for pipe lines, especially for gas pipe lines or city water conduits. More particularly, the present invention relates to a new tubular lining material for lining pipe lines therewith which contain a plurality of portions different in inner diameter and/or a number of complicated bends and curved portions in a single pipe line system.

2. Description of the Prior Art

It is well known that superannuation or damage of pipe lines for gas or water often causes dangerous leakage of gas or water. When such pipe lines are buried in the ground, damage of the underground pipe lines caused by external force or superannuation will induce an extremely dangerous burst of gas or water. Especially, in case of rupture of the underground pipe lines caused by superannuation, it usually occurs suddenly and is not predictable. A sole effective countermeasure in the past to prevent such troubles is that before such underground pipe lines have well been superannuated, the pipe lines are dug up over the length in the order of several ten or hundred meters and replaced with new ones. As a matter of course, much labor power and time as well as costs are required for exchange of the pipe lines in addition to difficulty in the pipe-exchange work itself. Further, supply of city gas or water has to be discontinued for a long period of time until the pipe-exchange work has been finished. In case the pipe lines are buried under the public roads, people encounters a great deal of trouble and inconvenience since any traffic on the roads is limited for a long distance during the pipe-exchange works. However, such pipe-exchange work on the underground pipe lines over the almost full length thereof is utterly ineffective for the purpose of reinforcing the pipe lines against external force such as earthquake, heavy traffic loads or road-repairing works. In order to reinforce pipe lines against such external force, the individual pipe may be reinforced with a lining material prior to construction of the pipe lines. However, this countermeasure cannot be applied to pipe lines already constructed and buried in the ground.

Under the above particular circumstances, a primitive method for lining underground pipe lines wherein a flexible plastic tube is inserted into underground pipe lines and bonded to the inner surface thereof was proposed for attaining both purposes of repairing damaged portions of the pipe lines and reinforcing them so as to withstand mechanical shock by external force. In such method, however, the step for inserting the flexible tube into the underground pipe lines is extremely difficult so that the work is almost impossible to operate in such place where the pipe lines are long and/or curved. Several methods successively developed for improving this primitive method comprise inserting a flexible tube into pipes while turning the tube inside out by the action of a pressurized fluid, and bonding the tube onto the inner surface of the pipes by the aid of a binder. The methods of this type are disclosed in U.S. Pat. Nos. 2,794,758. 3,132,062 and 3,494,813 and British Pat. No. 1,069,623. These methods are in fact improved in the step of inserting a flexible lining tube into pipes but are still unsatisfactory in attaining the pipe-lining works for underground pipe lines. All of the methods disclosed in these patents require the previous application of a binder onto the inner surface of a pipe or tube prior to insertion of the tube. However, these prior art methods have a number of drawbacks; the quantity and distribution of the binder cannot be controlled so that the binder is applied unevenly onto the inner surface of the pipe, and moreover, when the pipe is inclined, the head pressure of the binder acts only on the top or turning point of the tube advancing within the pipe where evagination of the tube takes place so that the pressure required for evagination of the tube fluctuates and the amount of the binder applied tends to vary.

With a view to further improving these methods, new pipe-lining methods were proposed in U.S. Pat. Nos. 4,368,091 and 4,334,943 and have been watched in recent years as excellent methods for lining pipe lines, especially underground pipe lines with a flexible reinforcing tube. According to these methods, a tubular lining material is inserted into pipe lines while turning it inside out and applying at the same time a binder onto the inner surface of the lining material evenly and the lining material is bonded onto the inner surface of the pipe lines with the binder being interposed therebetween by the action of a pressurized fluid. The method disclosed in the last-mentioned patent involves, in addition to the above fundamental construction, an improvement wherein a rope-like elongated element is previously passed through a tubular lining material beyond the full length thereof prior to applying a binder evenly onto the inner surface of the lining material and, when the lining material is inserted into a pipe line from one end thereof and allowed to advance within the pipe line while effecting evagination of the lining material and simultaneous application of the binder onto the inner surface of the pipe line under fluid pressure, the rope-like elongated element is drawn at a constant rate from the opposite end of the pipe line, thereby reducing the high fluid pressure necessary for evagination and advancement of the lining material and controlling the evagination speed so as to prevent any locally uneven application of the lining material especially in curved portions of the pipe line. Up to date, the method disclosed in U.S. Pat. No. 4,334,943 is regarded as one of the most advantageous methods for lining gas pipe lines or city water conduits having a number of bends or curved portions and an inner diameter of about 100 mm or more.

On the other hand, various kinds of tubular materials have been used as lining materials for pipes or pipe lines. For example, a tubular lining material of a three-layer sandwich structure comprising the innermost tubular film substrate overlaid with a woven or unwoven fibrous material impregnated with a thermocurable resin (a thermocurable FRP lining material) and a removable outer layer is proposed in Japanese Patent Publn. No. 51-40595 (1976). However, such laminated tubular lining material cannot be used according to the previously mentioned advantageous lining method wherein evagination of the tubular material is utilized for lining pipe lines. Further, such laminated lining material cannot be applied onto the inner surface of pipe lines in bends or curved portions without formation of wrinkles. Several kinds of tubular lining materials comprised of an unwoven fabric layer and an impervious filmy layer are proposed in British Pat. Nos. 1,569,675, 1,340,068, 1,357,355 and 1,449,455; U.S. Pat. Nos. 4,009,063 and 4,064,211; and Japanese Patent Publns. Nos. 58-39646, 55-43890, 58-33098. A tubular laminate disclosed in British Pat. No. 1,569,675 is comprised of a felt of a synthetic fiber such as polyester fiber and a gas impermeable layer of a synthetic resin such as polyurethane. However, no attention is paid in this patent to how the tubular laminate can be applied in good compliance with the inner surface of pipe lines in curved portions, so that the lining material will naturally form wrinkles in the curved pipe lines. The remaining patents and patent publications disclose chiefly methods of lining pipe lines with a similar tubular laminate such as a needled felt or mat of a synthetic fiber coated with a synthetic resin. All of the lining methods disclosed in these patents and patent publications are inferior to the improved method disclosed in U.S. Pat. No. 4,334,943, particularly in that no attention is paid in these lining method to prevent occurrence of wrinkles and spaces in pipes in bends or curved portions. A tubular lining material comprised of a woven fabric and an impervious film of a synthetic resin is also disclosed in Japanese Laid-open Patent Appln. No. 56-8229. This tubular lining material is made of a textile jacket knitted or woven in a tubular form (with a warp of a polyester multifilament yarn and a weft of a twisted polyamide yarn) overlaid with a flexible natural or synthetic rubber and is distinguished by being laterally expandable on application of pressurized fluid for evagination. Accordingly, the use of a lining material of this type can show good compliance with local change in inner diameter of the pipe line and can reduce to a certain degree the tendency of forming wrinkles of the lining material and also a space between the inner surface of the pipe line and the lining material in a bend of the pipe line. However, this effect is still unsatisfactory when the pipe line has a number of bends or curved portions.

The tubular lining materials proposed hitherto are used exclusively for reinforcing gas pipe lines or city water conduits, which are relatively larger in inner diameter (about 200 mm or more in inner diameter). On the other hand, service pipe lines and house pipe lines branched from such relatively large pipe lines for the purpose of supplying gas or city water to individual consumers have an inner diameter of about 27 mm [25 mm (1 inch) in nominal inner diameter] in a straight pipe portion. The inner diameter of such service pipe lines or house pipe lines fluctuates locally or in curved portions within the range from about 22 mm to about 34 mm (about 12 mm in difference). In this case, the difference of about 12 mm in inner diameter reaches about 50% of a nominal inner diameter of the service or house pipe lines. In case of the larger pipe lines or conduits, on the contrary, the difference of about 12 mm in inner diameter is only several percents of an average inner diameter and is usually negligible. On account of such a very high rate of fluctuation in inner diameter, the lining treatment of service pipe lines and house pipe lines with a conventional tubular lining material was extremely difficult to work even according to the method disclosed in U.S. Pat. No. 4,334,943 regarded to be one of the most advantageous methods for lining pipe lines up to date.

With a view to protecting individual consumers' families, shops and offices from any dangerous burst of gas caused by unexpected damage of their service pipe lines or house pipe lines, it is also necessary to reinforce such pipe lines having a relatively small inner diameter with a lining material. Up to date, however, a tubular lining material which has elasticity in good compliance with a high rate of fluctuation in the inner diameter of such relatively small pipe lines and is thus considered to be suitable for reinforcing such pipe lines has not yet been proposed in references of this art. Under these circumstances, there is a great demand for developing a new tubular lining material which can be applied to pipe lines with an inner diameter of 25–200 mm, especially service pipe lines and house pipe lines, which have a number of bends or curved portions and a high rate of fluctuation in the inner diameter, without permitting occurrence of wrinkles in curved portions.

BRIEF SUMMARY OF THE INVENTION

Accordingly, it is an object of the present invention to provide a new tubular lining material for pipe lines having a relatively small inner diameter and a number of bends or curved portions.

It is another object of the present invention to provide a new tubular lining material which can be applied without formation of wrinkles onto the inner surface of pipe lines, especially of bends or curved portions thereof having a high rate of fluctuation in inner diameter.

It is still another object of the present invention to provide a lining material woven in a tubular form including warps comprised fully or partly of an elastic yarn around which, over the full length thereof, a normal and/or crimped synthetic fiber yarn or yarns have been left- and/or right-handedly coiled.

It is further object of the present invention to provide a tubular lining material suitable for use in the method according to U.S. Pat. No. 4,334,943 for lining pipe lines having a relatively small inner diameter and a plurality of bends or curved portions.

Other objects, features and advantages of the present invention will become apparent more fully from the following description.

DETAILED DESCRIPTION OF THE INVENTION

As a result of the present inventors' study for developing new tubular lining materials, is has now been found surprisingly that the above mentioned drawbacks of the prior art tubular lining materials can be overcome and the lining treatment of pipe lines having a plurality of bends or curved portions and a relatively small inner diameter, such as service pipe lines and house pipe lines, with an impervious synthetic film-coated tubular textile jacket can be attained smoothly and satisfactorily according to a preferable lining method as disclosed in U.S. Pat. No. 4,334,943 by an improvement made in the lining material wherein warps of the tubular textile jacket are comprised fully or partly of an elastic yarn around which, over the full length thereof, a normal and/or crimped synthetic fiber yarn or yarns have been left- and/or right-handedly coiled. The present invention has been accomplished on the basis of the above finding.

In accordance with the present invention, therefore, there is provided a tubular lining material for pipe lines having bends or curved portions, which comprises a tubular textile jacket made of warps and wefts woven in a tubular form overlaid with a coating of a flexible synthetic resin and is applicable onto the inner surface of a pipe line having bends or curved portions in such manner that the tubular lining material with a binder onto the inner surface thereof is inserted into the pipe line and allowed to advance within the pipe line with or without the aid of a leading rope-like elongated element while turning the tubular lining material inside out under fluid pressure thereby applying the tubular lining material onto the inner surface of the pipe line with the binder being interposed between the pipe line and the tubular lining material, characterized in that a part or all of the warps are comprised of an elastic yarn around which, over the full length thereof, normal and/or crimped synthetic fiber yarns have been left- and/or right-handedly coiled.

The present invention can more fully be understood from the following description taken in conjunction with the accompanying drawings in which.

An example of pipe lines having a relatively small inner diameter and a plurality of complicate bends or curved portions is seen in service pipe lines and house pipe lines for gas branched from a main pipe line or conduit usually buried in the ground. These pipe lines serve to supply gas to individual consumers' houses, shops and offices. By the term "service pipe line" is meant a pipe line connecting the main pipe line and a gas meter installed in the individual consumer's building. On the other hand, the term "house pipe line" means the individual consumer's indoor pipe line extending beyond the gas meter. In general, the service pipe lines are buried in the ground as well.

Figure 1:
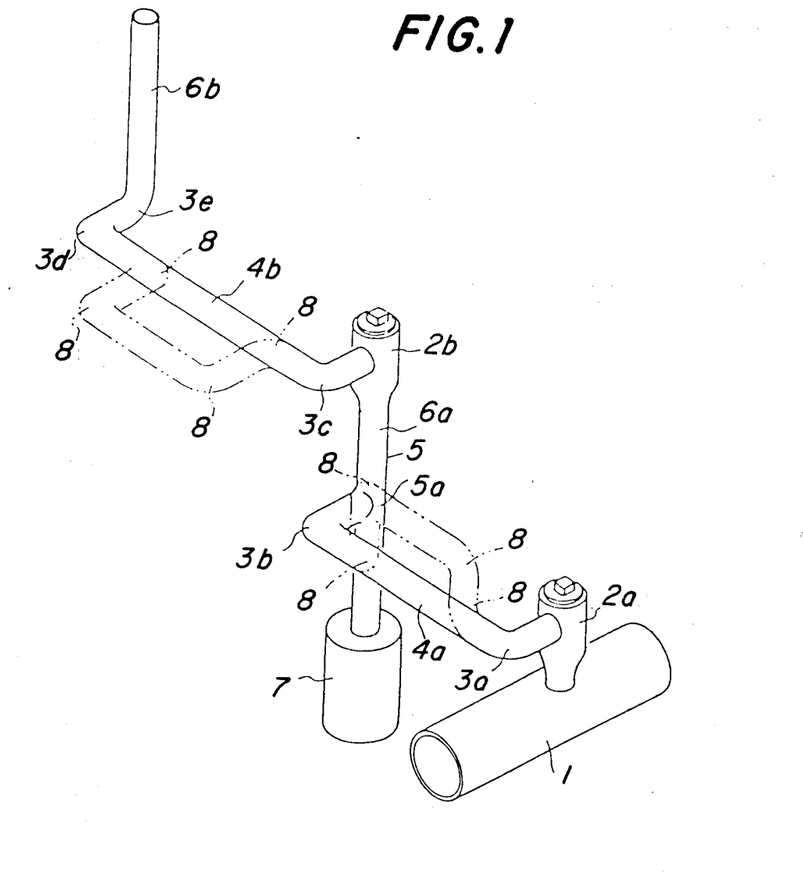
FIG. 1 is a schematic perspective view showing an example of a service pipe line system for gas.

In FIG. 1, a service tee 2a is connected to a branched main pipe line. A branched pipe from the service tee 2a extends via a bend 3a, a horizontal portion 4a and a bend 3b to a T-shape portion 5a of a tee pipe 5. A pipe extending upwardly from the T-shape portion 5a is connected via a service riser 6a to a service tee 2b while the lower part of the tee pipe 5 is connected to a syphone 7. A branched pipe from the service tee 2b extends via a bend 3c, a horizontal portion 4b, a bend 3d and a bend 3e, emerges from the ground at a riser 6b and is connected to a meter (not shown). If obstacles exist in the straight path of the pipe line, the horizontal portions 4a and 4b are bent by the aid of elbows 8 to make detour so that the pipe line becomes as a whole complicate and rich in curved portions.

In general, the service pipe line shown in FIG. 1 is small in inner diameter and usually has a nominal inner diameter of 25 mm (about 1 inch). This pipe line has an inner diameter of 27 mm in a straight pipe portion but has portions where the inner diameter is locally decreased to 22 mm or increased to 34 mm, thus making a difference of about 12 mm in inner diameter. As remarked hereinbefore, the difference of 12 mm in inner diameter reaches about 50% of a nominal inner diameter (about 25 mm) of the service or house pipe lines unlike the case of main pipe lines with an inner diameter as large as about 200 mm or more where the fluctuation in inner diameter is almost negligible even in case the difference becomes 12 mm. Accordingly, a tubular lining material to be applied onto the inner surface of such service or house pipe lines has to comply fully with the fluctuation in inner diameter thereof, or in other words, the tubular lining material has to be fully in compliance with the inner surface of the pipe lines locally varying in inner diameter at least within the range from 22 mm (in the narrowest portion) to 27 mm (an average inner diameter in a straight pipe portion) and has to be applied uniformly, without formation of wrinkles or any space between the inner surface of the pipe line and the tubular lining material, onto the inner surface of the pipe lines not only in the straight pipe portion but also in bends, e.g. the service tees 2a and 2b, the bends 3a–3e, the T-shape portion 5a and the elbows 8 in FIG. 1 where the pipes are bent at almost right angle but the tubular lining material has also to be applied onto the inner surface thereof while keeping good compliance therewith.

Figure 2:
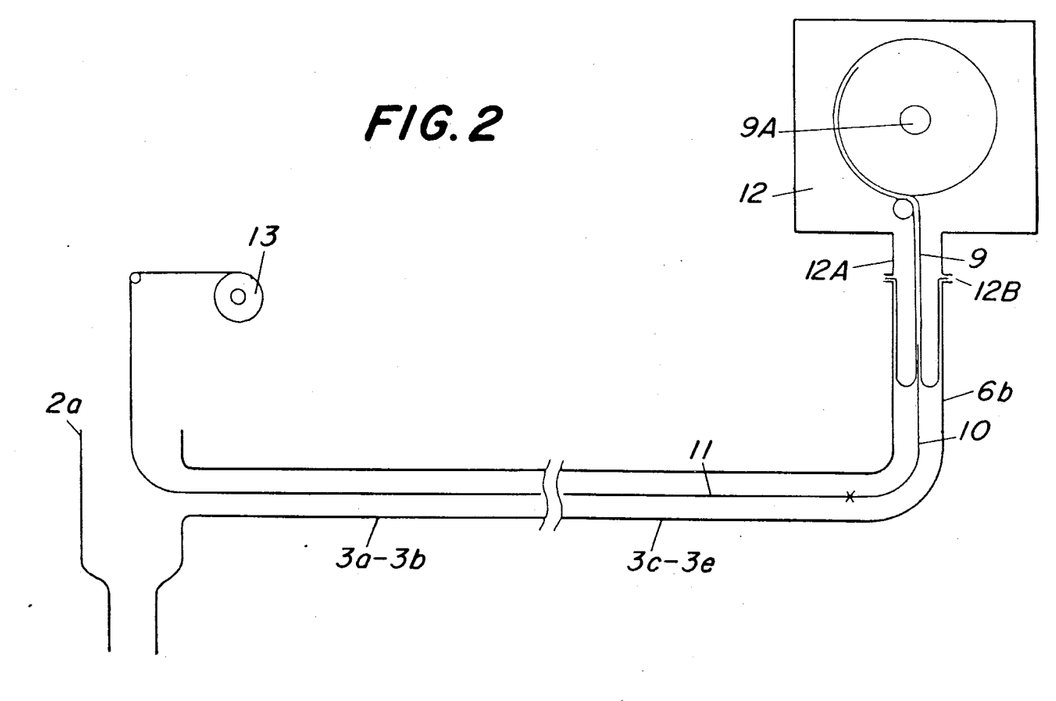
FIG. 2 is a schematic view showing a method for providing a service pipe line for gas with a tubular lining material.

In FIG. 2 illustrating a lining method for such service line, a service pipe line as shown in FIG. 1 is schematically shown by a service tee 2a, a pipe having bends 3a–3b, a pipe having bends 3c–3e and a riser 6b, omitting a service tee 2b, a T-shaped portion 5a and a service riser 6a. A tubular lining material 9 is first manufactured by weaving a weft and specific warps in a tubular form and applying onto the resultant tubular textile jacket a coating of a flexible synthetic resin. A rope-like elongated element 10 is then passed through the tubular lining material 9 beyond the full length thereof prior to applying a binder evenly onto the inner surface of the lining material 9. The tubular lining material 9 thus pre-treated is then wound in flattened state on a reel 9A and a roll of the tubular lining material 9 is placed in a pressure container 12 provided with an inlet (not shown) for pressurized fluid.

The rope-like elongated element 10 may be a rope itself made of natural or synthetic fibers but is preferably a belt of a similar material since the tubular lining material 9 is flattened and wound on the reel 9A. This rope-like elongated element 10 can previously be passed through the tubular lining material preferably according to a method disclosed in Japanese Utility Model Publn. No. 58-50583 by inserting a bullet-shape needle connecting the rope-like elongated element to the rear part thereof somewhat reduced in diameter into the tubular lining material in flattened state, squeezing the tubular lining material externally at the rear part of the needle with a pair of nip rolls and pushing the needle forward within the tubular lining material by rotating the nip rolls. A binder can easily be applied onto the inner surface of the tubular lining material according to any appropriate manner, for example, by enclosing a large amount of the binder in one end of the tubular lining material, squeezing it between the nip rolls. Any excess amount of the binder can be recovered at the other end of the tubular lining material. Various kinds of binders can be used for this purpose but they should preferably be non-volatile and free from any volatile solvent and moisture which may disturb entire adhesion of the tubular lining material onto the inner surface of the pipe lines. In general, solvent-free, self-curable binders at ordinary or elevated temperature come into question. A binder of epoxy type, acrylic type or polyester type is preferable, with a commercially available two-component epoxy resin being most preferable.

On the other hand, a leading rope-like elongated element 11 is also previously passed through the service pipe lines and one end of the element 11 is connected at any disired point to the rope-like elongated element 10 extending from the end of the tubular lining material 9 and the other end is fixed to a winder 13 placed out of the pipe line. The tubular lining material 9 is reeled off and passed through a nozzle 12A of the pressure container 12 and the free end of the lining material 9 is fixed in evaginated state to an annular fastener 12B at the end of the nozzle 12A. The riser portion 6A of the service pipe line is connected directly or via an induction pipe or adapter (not shown) to the annular fastener 12B. The rope-like elongated element 11 is then pulled forward by operating the winder 13 while introducing pressurized fluid into the pressure container 12 through the inlet whereby the tubular lining material 9 induced by the rope-like elongated element 10 is allowed to advance within the service pipe line with simultaneous evagination and adhesion onto the inner surface of the pipe line even in case of passing through bends or complicate curved portions. The evagination velocity of the tubular lining material 9 is exclusively controlled by the drawing speed of the winder 13 while the pressurized fluid is desirably kept under a pressure low enough to attach the evaginated tubular lining material 9 onto the inner surface of the pipe line.

In case of relatively small service or house pipe lines with a plurality of bends having a complicate structure, however, the force for introducing the tubular lining material into the pipe lines is significantly weakened due to frictional resistance between the rope-like elongated elements 10 and 11 and the inner wall of the pipe lines in bends or curved portions, even if a stronger force is exerted to the winder 13. Accordingly, the prior art tubular lining material can hardly be passed through such service or house pipe lines with a high rate of fluctuation in inner diameter and a plurality of complicate bends.

Figure 3A:
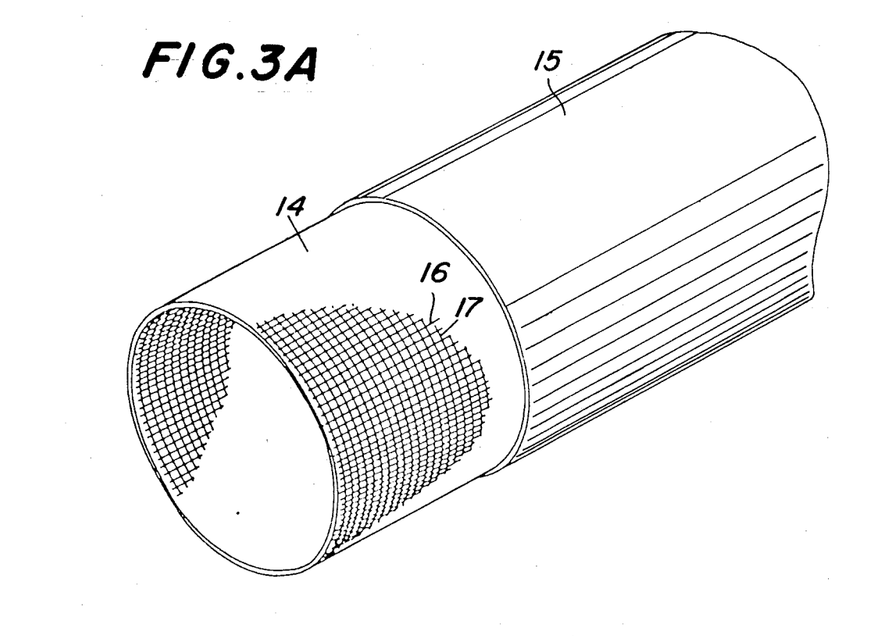
FIG. 3(A) is a perspective cut away view of the tubular lining material of the present invention showing a tubular textile jacket and a coating of a flexible synthetic resin thereon.

In FIG. 3 illustrating the structure of the tubular lining material of this invention in inflated form, a tubular textile jacket 14 is provided on the outer surface thereof with an air-tight coating 15 of a flexible synthetic resin. The tubular textile jacket 14 can be manufactured by weaving specific warps 16 and weft 17 into a tubular form and is then coated on its outer surface with a synthetic resin to form the tubular lining material of this invention. Examples of the utilizable synthetic resin include a polyester elastomer and a polyether polyurethane elastomer. The polyester elastomer is a block copolymer of an aromatic polyester and an aliphatic polyetherdiol and is regarded as a thermoplastic synthetic resin which is flexible and gas-impervious and is excellent in rubbery elasticity, moldability, heat-resistance weather-resistance, oil-resistance, chemicals-resistance and abrasion-resistance. The polyether polyurethane elastomer is derived from a similar polyetherdiol and a polyisocyanate and possesses similar physico-chemical characteristics. The thickness of the coating 15 varies according to the intended purpose and size or inner diameter of the pipe lines to be treated, but is usually within the range from about 0.2 mm to about 0.6 mm for lining the service or house pipe lines for gas. In general, the synthetic resins are desirable as a base material for the coating 15 since they retain parmanent set in elongated state unlike the case of natural rubber. Further, the synthetic resins are smaller than natural rubber in frictional resistance produced between the surfaces of the coating 15 when the tubular lining material is allowed to advance within the pipe lines.

The inner diameter of the tubular textile jacket 14 varies according to the size or inner diameter of pipe lines to be treated. In case the jacket 14 is applied onto the inner surface of service or house pipe lines for gas, for example, the inner diameter of the tubular textile jacket is so adjusted as to comply with a pipe having a nominal inner diameter of 25 mm (about 1 inch). For convenience's sake, a detailed explanation of the tubular textile jackets of this invention will be given hereinafter for those to be applied to such service or house pipe lines for gas. The gist of the present invention resides in the tubular textile jacket especially in the structure of warps 16.

Figures 3B, 3C:
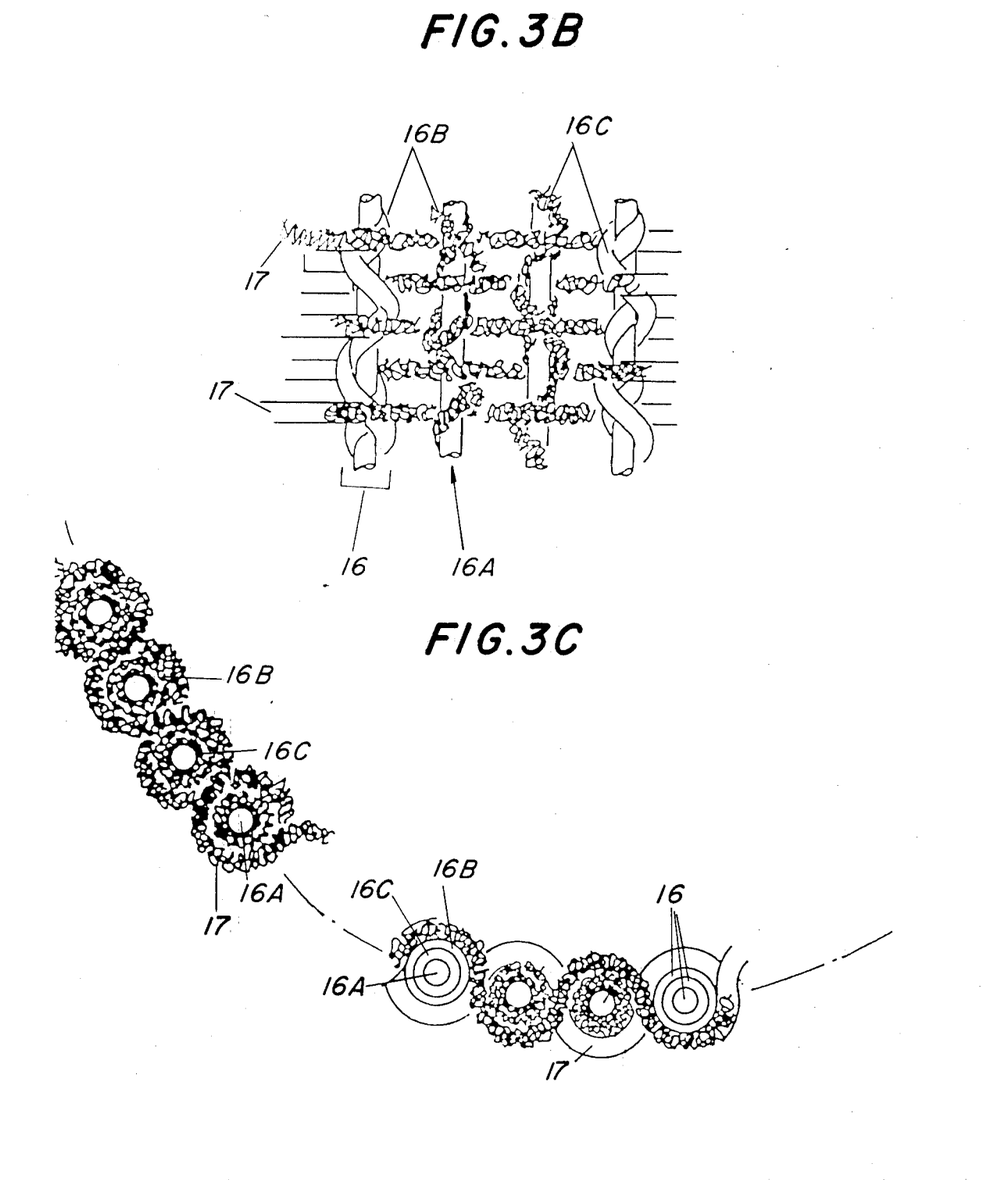
FIG. 3(B) is a schematic partially enlarged plane view of one example of the tubular textile jacket of FIG. 3(A).
FIG. 3(C) is a schematic partially enlarged section view of one example of the tubular textile jacket of FIG. 3(A).

In FIGS. 3(B) and 3(C) showing one example of the tubular lining material of this invention, the tubular textile jacket is made or warps 16 and wefts 17, each warp being comprised of an elastic yarn 16A around which, over the full length thereof, a left-handed synthetic fiber yarn 16B and a right-handed synthetic fiber yarn 16C have been coiled. More particularly, the tubular textile jacket is made of 117 warps 16 each comprised of a 210 denier polyurethane elastic yarn 16A around which, over the full length thereof, a left-handed 150 denier crimped yarn made of polyester fiber 16B and a right-handed 150 denier crimped yarn made of polyester fibers have been coiled and a weft 17 made by twisting three 150 denier crimped yarns made of polyester fibers and picked up at 20 pick count/inch to form a tubular textile jacket.

A polyurethane elastic yarn alone may be used as warp to increase elasticity thereof. In this case, however, elongation of the warp becomes excessive and reached about 700%. The use of such highly elastic yarns partially or wholly as warps rather incurs undesirable results; the tubular lining material cannot be passed smoothly through the pipe line in curved portions or the quality of the tubular textile jacket becomes uneven due to a significant local difference in elongation between the polyurethane elastic yarn and the ordinary crimped or spun yarn. It has now been found that the elongation of such polyurethane elastic yarn can effectively be reduced to a desirable value as low as about 120% by coiling a normal or crimped synthetic yarn or yarns preferably made of polyester fibers in either or both of left- and right-handed directions around the polyurethane elastic yarn over the full length thereof. On weaving the tubular textile jacket, the polyurethane elastic yarn is woven in stretched state. In case the weft is picked up at 20 pick count/inch, therefore, the warps in the resultant tubular textile jacket is shrinked to about 45 pick count/inch. In connection with the lateral direction, on the other hand, the tubular textile jacket with a folding width of 43 mm is subjected to a proper heat treatment such as dipping in hot water so that the tubular textile jacket may be shrinked to have a folding width of 32 mm. Thus, this tubular textile jacket has an ultimate diameter of about 20.5 mm but can be inflated easily by a relatively weak force to have a diameter of about 27 mm which corresponds to the original folding width. A relatively strong force will be needed if this tubular textile jacket is inflated further, since the crimped yarn has almost completely been stretched. On the other hand, the tubular textile jacket can be stretched up to about 100% in longitudinal direction by a relatively weak force but can be shrinked almost to the original length due to ealsticity of the polyurethane elastic yarns used as warps by relief of the tensile force.

The yarn to be coiled around the polyurethane elastic yarn over the full length thereof may be a normal synthetic fiber yarn, e.g. an ordinary yarn made of polyester fibers but is preferably a crimped synthetic fiber yarn, e.g. a crimped yarn made of polyester fibers. In a preferable embodiment of this invention, such synthetic fiber yarn is coiled around the polyurethane elastic yarn in both left- and right-handed directions over the full length of the elastic yarn. By coiling the synthetic fiber yarn in dual directions around the elastic yarn, a high rate of elongation of the elastic yarn can effectively reduced and reinforcement of the elastic yarn can additionally be attained. In another embodiment of this invention, the synthetic fiber yarn, preferably a crimped yarn made of polyester fibers is coiled around the elastic yarn in either of the left- and right-handed directions. In case of coiling the synthetic fiber yarn around the elastic yarn in a single direction, reinforcement of the elastic yarn with the synthetic fiber yarn may become somewhat inferior to the case wherein the synthetic fiber yarn is coiled around the elastic yarn in dual direction, but is convenient for economical reasons and can achieve an almost equivalent effect in practical use.

The warps 16 used in the tubular textile jacket are not limited to the yarns as referred to above. The elastic yarn, preferably polyurethane elastic yarn around which a normal and/or crimped synthetic fiber yarn or yarns preferably made of polyester fibers have been coiled in either or both left- and right-handed directions over the full length of the elastic yarn may be used together with ordinaly filament yans of spun yarns as warp. In this case, the proportion of such ordinary filament yarns or spun yarns to the elastic yarn around which the normal and/or crimped synthetic fiber yarns have been coiled is not particularly critical but the proportion has to be limited naturally so that the warps may ultimately have an elongation of about 120%.

The filament yarns or spun yarns per se are not so great in elongation. Since the polyurethane elastic yarn around which a normal and/or crimped yarn or yarns have been coiled over the full length of the elastic yarn is woven in strectched state and since the filament yarns or spun yarns jointly used therewith as other constituents in the warp are also woven in stretched state, the elastic yarns is shrinked on account of its elasticity and the filament yarns or spun yarns also exist in shrinked state in the resultant tubular textile jacket. Thus, coexistence of the filament yarns or spun yarns does not adversely affect stretchability of the tubular textile jacket.

The elastic yarn used for the specific warp of this invention is not limited to the one of polyurethane series. Elastic threads of natural rubber or synthetic rubber such as butyl rubber, AS rubber, ASB rubber or EPDM rubber may be used in place of the polyurethane elastic yarn. In case of the natural rubber thread, however, natural rubber itself easily tends to undergo degradation by the action of UV-rays or heat and is inferior in elongation to the polyurethane elastic yarn. On the other hand, the majority of synthetic rubbers are improved in resistance to degradation as compared with natural rubber. Accordingly, polyurethane elastic yarn as well as degradation-resistant synthetic rubber threads are utilizable for the elastic yarn used in the tubular lining material of this invention. Because of superiority in fiber characteristics, however, the use of polyurethane elastic yarn is most preferable in the present invention as the elastic yarn for warps.

The yarn used for the weft 17 of the tubular textile jacket 14 is not limited to the normal and/or crimped yarn of polyester fibers as referred to above. The weft may be normal and/or crimped yarns made of other synthetic fibers. Ths use of crimped yarns especially made of polyester fibers is preferable in this invention because such crimped yarns used as weft can be entangled with the warps and improves adhesion of a coating of the impervious synthetic resin to the woven tubular textile jacket. The weft may further be the polyurethane elastic yarn around which a normal and/or crimped synthetic fiber yarn or yarns have been coiled in the single or dual directions over the full length of the elastic yarn, as utilized for the specific warp. In this case, such weft is extremely greater in elasticity than the crimped synthetic fiber yarn so that there is no necessity of the heat·treatment for shrinking the tubular textile jacket in lateral direction to have a reduced folding width. In case the tubular lining material is applied to pipe lines having a very high rate of fluctuation in inner diameter thereof, the use of such weft is particularly suitable in that it has a very high compliance with the varying inner diameter of the pipe lines.

When the tubular lining material of this invention is applied to the lining treatment for service pipe lines or house pipe lines for gas according to the method as illustrated in FIG. 2, a fluid pressure required therefor is usually within the range of 0.5–2 kg/cm$^2$. If the fluid pressure is too low, the tubular lining material will not be allowed to advance within the pipe line with satisfactory inflation and evagination. On the other hand, if the fluid pressure is excessively high, there may be a damage of the tubular lining material itself. The evaginated tubular lining material is expanded in lateral direction simultaneously with being stretched in longitudinal direction. The tubular lining material should preferably have an elongation in longitudinal direction of at least 10% under the fluid pressure. As the tubular lining material has been stretched in longitudinal direction under fluid pressure, the tubular lining material is sufficiently stretched in the longer curved wall of a bend of the pipe line, such as service tee 2a or 2b, bends 3a–3e, T-shape portion 5a and elbows 8, but is shrinked in the shorter curved wall of the bend where the tensile force is not exerted. Contrary to this, the prior art tubular lining material which is insufficient in elongation in longitudinal direction is locally detached from the longer curved wall of the bend, thus forming a space between the inner wall of the pipe line and the tubular lining material to narrow the flow path of gas. If the prior art tubular lining material is forcedly attached to the longer curved wall of the bend, big wrinkles will be formed in the tubular lining material attached to the shorter curved wall of the bend and will disturb the flow of gas. As the tubular lining material of the present invention is stretchable and shrinkable under fluid pressure for evagination, the tubular lining material has a good complicance with the curved wall of the bend and can be attached tightly, without formation of wrinkles, onto the inner surface of the pipe lines in both straight and curved portions.

The tubular lining material of this invention is also stretchable or shrinkable in diametrical or lateral direction under fluid pressure. Accordingly, it can easily be expanded to have an inner diameter of about 27 mm which corresponds to the original folding width on weaving the tubular textile jacket. As the inner diameter of the service pipe line is almost equal to 27 mm in straight portion, the tubular lining material can also be applied tightly onto the inner surface of the pipe line in straight portion. The tubular lining material before expansion is small in inner diameter than the service pipe line in the narrowest portion so that the tubular lining material is bonded in somewhat expanded state onto the inner surface of the pipe line in such portion, without forming any wrinkle in the lining material or any space between the lining material and the inner surface of the pipe line.

The outer diameter of the tubular lining material of this invention should preferably 80-100% of the inner diameter of the pipe line in the narrowest portion. If the outer diameter is less than 80%, it will be necessary to expand the tubular lining material significantly on evagination. In this case, stress of the coating on the tubular textile jacket becomes larger so that necessity of increasing the fluid pressure and incidental possibility of forming pinholes in the coating will occur. On the other hand, if the outer diameter exceeds 100%, wrinkles in longitudinal direction will be formed in the tubular lining material existing in the pipe line in the narrowest portion, thus failing to attain application of the lining material evenly onto the inner surface of the pipe line.

Figures 4, 5A:
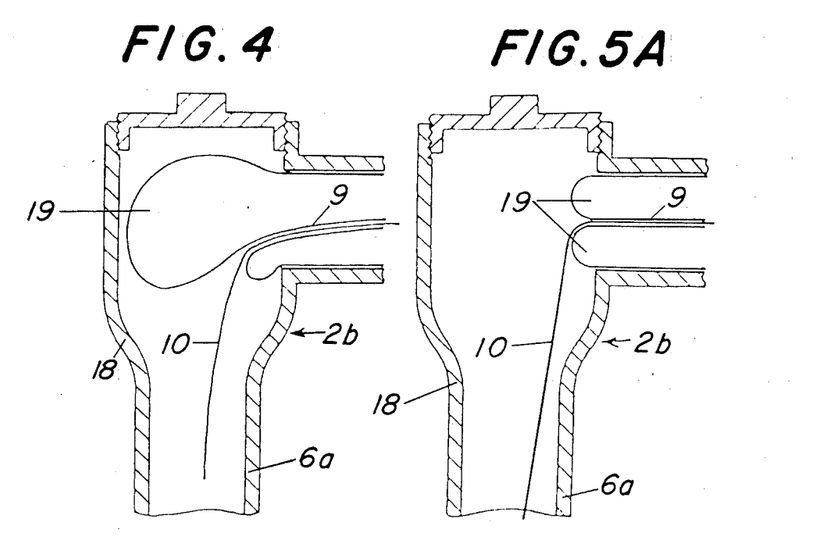
FIG. 4 is a schematic diagram showing the state of lining a bend of a service pipe line with a tubular lining material having an outer diameter exceeding 130% of the inner diameter of the pipe line in a straight portion thereof or having a too high elongation in longitudinal direction.
FIGS. 5(A)–5(C) are a series of schematic diagrams showing the state of lining a bend of a service pipe line with a tubular lining material of the present invention.

The outer diameter of the tubular lining material under fluid pressure for evagination should preferably 100-130% of the inner diameter of the pipe line in straight portion. If the outer diameter is less than 100%, the tubular lining material will not be attached tightly onto the inner surface of the pipe. In FIG. 4 schematically showing the cross section of the service tee 2b and the evagination mode of the tubular lining material, the upper part of the service tee 2b having an opening for the branch pipe is slightly larger in inner diameter than the riser 6c. The inner diameter of the upper part is usually 34 mm and is decreased in a tin part 18 at a distance of about 60 mm from the top where the inner diameter becomes equal to that of the riser 6a. The tubular lining material 9 is allowed to advance simultaneously with evagination within the branch pipe and enters in the service tee 2b when the rope-like elongated element 10 is drawn under fluid pressure. If the outer diameter of the tubular lining material 9 exceeds 130% of the inner diameter of the pipe line, the front end 19 of the lining material forming the turning point where evagination occurs will be inflated significantly in the space of the upper part of the service tee 2b where the inner diameter becomes larger. In such case, the abnormally inflated front end 19 of the lining material 9 is attahced to the inner wall of the tin part 18 and deformed so that it becomes almost impossible to induce the tubular lining material 9 downward even by strengthening the drawing force of the rope-like elongated element 10 because the inside space of the riser 6a is too small for the inflated front end 19 of the tubular lining material 9. A similar phenomenon takes place when the elongation in longitudinal direction of the warp exceeds 120%.

Thus, unexpectedly remarkable advantages can be achieved by the tubular lining material of this invention especially for lining pipe lines having a relatively small inner diameter and a high rate of fluctuation therein since the tubular lining material is stretchable and shrinkable to a definite degree in longitudinal direction due to the specific structure of the warps. This technical advantages of this invention are obvious from comparison of FIG. 4 with FIGS. 5(A)-5(C).

Figures 5B, 5C:
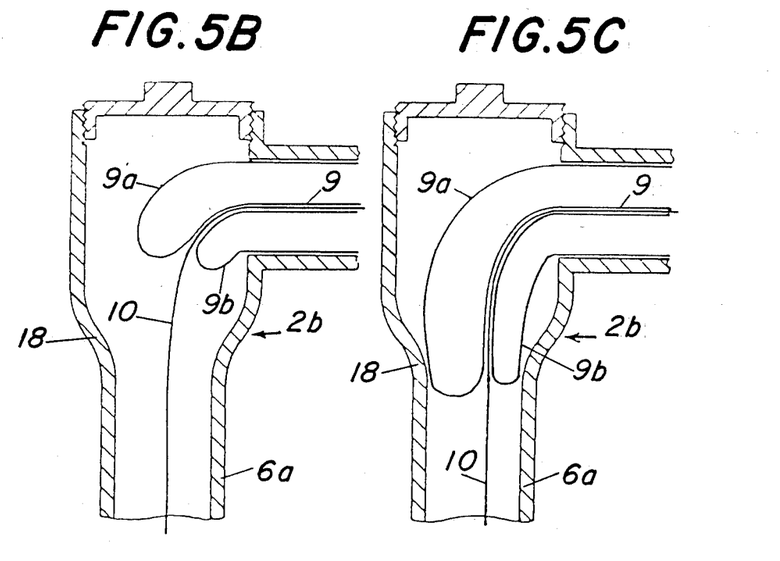

In FIGS. 5(A)-5(C) showing the pipe-lining mode of the tubular lining material of this invention at every stage in passing the lining material through the service tee 2b of the service pipe line, the numerals 2b, 6a, 9, 10, 18 and 19 have the same meanings as given in FIG. 4 and the front end 19 of the tubular lining material 9 is separately defined, for the sake of convenience, as an outer curved portion 9a and an inner curved portion 9b.

In FIG. 5(A) showing the state of evagination just before the service tee 2b, the direction of the horizontally moving tubular lining material 9 is changed downward as the downwardly acting force is exerted to the rope-like elongated element 10 to induce the front end 19 of the lining material 9 in descending direction.

In FIG. 5(B) showing the initial stage of passing through the service tee 2b, the outer curved portion 9a of the tubular lining material 9 is stretched by a relatively weak force while the inner curved portion 9b stretched under fluid pressure is shrinked to the original state, so that the front end of the tubular lining material 9 can easily change its advancing direction. At this stage, the outer curved portion 9a is not inflated significantly in contrast to the case shown in FIG. 4.

In FIG. 5(C) showing the last stage of passing through the service tee 2b, the tubular lining material 9 is drawn downwardly with a relatively weak force and passed through the tin part 18 smoothly without permitting the formation of any wrinkle in the inner curved portion 9b.

In case of the prior art tubular lining materials, on the contrary, no consideration is paid to impart an appropriate elongation in lengthwise direction to the lining materials with a view to adapting them for lining of pipe lines having a relatively small inner diameter and a high rate of fluctuation in inner diameter, such as service or house pipe lines for gas. In case of using the prior art tubular lining material, therefore, occurrence of wrinkles or narrowing of flow path in the lining material is unavoidable in bends of service or house pipe lines.

Figure 6A:
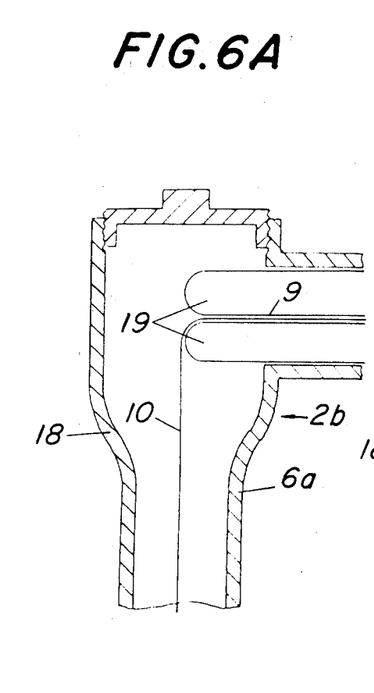
FIGS. 6(A) and 6(B) are a series of schematic diagrams showing the state of lining a bend of a service pipe line with a tubular lining material having a too low elongation in longitudinal direction.
Figure 6B:
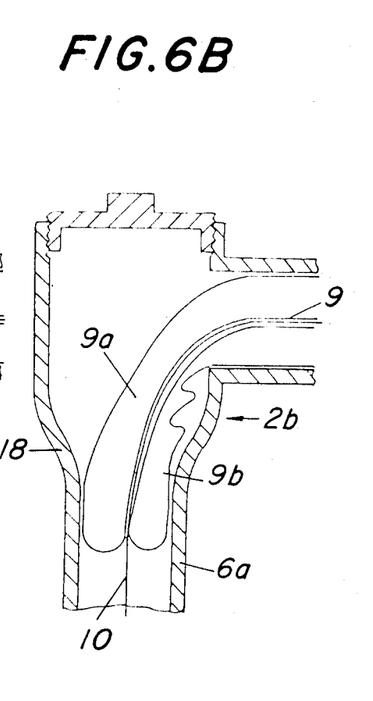

In FIGS. 6(A) and 6(B) showing the pipe-lining mode of the tubular lining material at the initial and last stages in passing the lining material through the service tee 2b of the service pipe line, the numerals 2b, 6a, 9, 9a, 9b, 10, 18 and 19 have the same meanings as given in FIGS. 5(A)-5(C).

In FIG. 6(A) showing the initial stage of passing through the service tee 2b, the tubular lining material 9 lacking elasticity in lengthwise direction enters somewhat deeply in the space of the service tee 2b so that the front end 19 comes to the almost central part thereof although the downward force sufficient enough to bend the tubular lining material of this invention is exerted to the rope-like elongated element 10.

In FIG. 6(B) showing the last stage of passing through the service tee 2b, the tubular lining material 9 is drawn downwardly with a strong force exerted to the rope-like elongated element 10 and passed through the tin part 18. As the tubular lining material 9 lacks elongation in lengthwise direction and the drawing force is stronger, the tubular lining material 9 is violently bent at the central space in the service tee 2b whereby the outer curved portion 9a is bent in such state that it cannot be inflated sufficiently. Thus, the lining material 9 bent at almost right angle becomes narrower in cross section and, on the other hand, the inner curved portion 9b of the lining material 9 forms wrinkles because of lacking elasticity in lengthwise direction.

In actual comparative experiments for checking this phenomenon using the two tubular lining materials which were identical with each other in the sort of resin, thickness of the coating and stretchability in diametrical direction except that one sample concerned with the present invention was stretchable in lengthwise direction but the other sample as control was not stretchable, the sample which was 20% stretchable in lengthwise direction under fluid pressure of 1 kg/cm$^2$ could be passed through the service tee 2b by an induction force as weak as 0.5 kg under such fluid pressure but the other sample which was not stretchable under the same pressure required an induction force of about 3 kg under the same pressure for passing the sample through the service tee 2b. In case of the stretchable tubular lining material of this invention, the outer curved portion 9a of the front end in the service tee 2b had an elongation of 50-60%. For expecting such technical effect, the elongation in lengthwise direction of the tubular lining material should be at least about 10% under fluid pressure for evagination.

The tubular lining material of the present invention is basically comprised of a tubular textile jacket overlaid with a coating of an impervious synthetic resin and is characterized by making the tubular textile jacket elastic in longitudinal direction even by a weak tensile force. These characteristic properties of the tubular lining material are achieved by using a specific elastic yarn for a part or whole of the warps. An elastic yarn itself such as a polyurethane elastic yarn is too high in elongation so that the use of such elastic yarn as warps gives rather adverse effects. In the warps used in the present invention, a normal and/or crimped synthetic fiber yarn or yarns are coiled in either or both of left- and right-handed directions around the elastic yarn over its full length, so that the elastic yarn is fully covered with the synthetic fiber yarns and protected against any damage on turning the tubular lining material inside out within the pipe lines in addition to the aforesaid advantage that the elongation in lengthwise direction of the elastic yarn can be controlled to about 120% and the tubular lining material can be applied uniformly and tightly onto the inner surface of pipe lines in complicate bends. A crimped yarn made of synthetic fibers especially polyester fibers is preferable as the yarn to be coiled around the elastic yarn since the elastic yarn can entirely be covered with such crimped yarn which has a great number of complicately curled fibers extending from the yarn body and such used as weft so that a liquid or viscous curable synthetic resin to be applied as an impervious coating onto the tubular textile jacket can satisfactorily be penetrated thereinto and thus bonding of an impervious coating of a flexible synthetic resin to the tubular textile jacket is firmly secured. The warps may consist of the elastic yarn alone or may be comprised of the elastic yarn and ordinary filament yarns or spun yarns. In the latter case, i.e. in case of usuing the elastic yarn as a part of warps, strength of the tubular lining material in lengthwise direction can be maintained.

Unlike the case of main pipe lines, service pipe lines and house pipe lines are generally small in inner diameter thereof and have a number of complicate bends at a high rate of fluctuation in inner diameter. The use of the tubular lining material of the present invention makes it possible for the first time to provide such service pipe lines or house pipe lines with a lining material for reinforcement in good compliance with the complicate shape of the pipe lines without forming any wrinkles in the lining material or any space between the pipe line and the lining material. None of the prior art tubular lining materials can attain such remarkable technical merits in the pipe-lining operations for service or house pipe lines having a smaller inner diameter and a number of bends in complicate shapes.

As many apparently widely different embodiments of the present invention may be made without departing from the spirit and scope thereof, it is to be construed that the present invention is not limited to the specific embodiments thereof except as defined in the appended claims.

What is claimed is:

1. A tubular lining material for pipe lines having bent or curved portions, which comprises a tubular textile jacket made of warps and wefts woven in a tubular form overlaid with a coating of a flexible synthetic resin and adapted to be applied to the inner surface of a pipe line having bends or curved portions in such a manner that the tubular lining material containing a binder disposed on the inner surface thereof is inserted into the pipe line and allowed to advance within the pipe line while turning the tubular lining material inside out through the application of fluid pressure to apply the tubular lining material onto the inner surface of the pipe line with the interposition of the binder between the pipe line and the tubular lining material, wherein a part of the warps are composed of an elastic yarn around which at least one synthetic yarn is coiled over the full length of the elastic yarn.

2. The tubular lining material according to claim 1, wherein the weft is a synthetic yarn.

3. The tubular lining material according to claim 1, wherein the weft is composed of an elastic yarn around which a synthetic yarn has been coiled, left-handed over the full length of the elastic yarn.

4. The tubular lining material according to claim 1, wherein the elastic yarn is a polyurethane elastic yarn.

5. The tubular lining material according to claim 1, wherein the synthetic yarn is a crimped yarn made of polyester fibers.

6. The tubular lining mateial according to claim 2, wherein the synthetic yarn is a crimped yarn made of polyester fibers.

7. The tubular lining material according to claim 3, wherein the elastic yarn is a polyurethane elastic yarn.

8. The tubular lining material according to claim 3, wherein the synthetic yarn is a crimped yarn made of polyester fibers.

9. The tubular lining material according to claim 1, having an elongation of 10-100% in the longitudinal direction.

10. The tubular lining material according to claim 1, wherein the outer diameter of the tubular lining material is 80–100% of the inner diameter of the pipe line to be treated in its narrowest portion.

11. The tubular lining material according to claim 1, wherein the outer diameter of the tubular lining material under fluid pressure for turning the tubular lining material inside out is 100–130% of the inner diameter of the pipe line to be treated in its straight portion.

12. The tubular lining material according to claim 1, wherein the synthetic yarn is coiled in the left-handed direction.

13. The tubular lining mateial according to claim 1, wherein the synthetic yarn is coiled in the right-handed direction.

14. The tubular lining material according to claim 1, wherein the weft is composed of an elastic yarn around which a synthetic yarn has been coil, right-handed, over the full length of the elastic yarn.

* * * * *